UNITED STATES PATENT OFFICE.

MAX DIETRICH AND ALFONS LANGER, OF BERLIN, GERMANY.

PROCESS OF PRODUCING BLOOD-ALBUMEN.

SPECIFICATION forming part of Letters Patent No. 688,604, dated December 10, 1901.

Application filed November 6, 1900. Serial No. 35,600. (No specimens.)

*To all whom it may concern:*

Be it known that we, MAX DIETRICH and ALFONS LANGER, both residing in Berlin, in the Empire of Germany, have invented certain new and useful Improvements in Processes of Producing Blood-Albumen, of which the following is a specification.

This invention relates to the production of blood-albumen; and the object of the invention is to provide a process by which an easily-pulverizable blood-albumen insoluble in water, but soluble in the gastric juice and containing a large percentage of iron, can be obtained.

For this purpose the invention consists of the process hereinafter described of producing a blood-albumen insoluble in water which comprises the steps of mixing with defibrinated blood a quantity of calcium hydroxid in substantially the proportion herein specified, allowing the solution to coagulate, drying the product thus obtained, grinding the same, washing the same with water, and then finally drying; and the invention consists, further, in the blood-albumen produced by said process, the same being a deep-black powder of fine grain, having neither smell nor disagreeable taste, having a greenish-brown appearance when finely pulverized, and insoluble in water, but easily soluble in the pepsin-containing digestive fluids.

In carrying out our improved process pure ox-blood or blood from calves is employed. The blood is first defibrinated, which may be accomplished by any suitable process. In one hundred kilograms of this defibrinated blood are dissolved from four to five kilograms of an aqueous paste containing from forty to fifty per cent. of calcium hydroxid. The calcium hydroxid soon dissolves, and after a few hours the formation of the calcium albuminates is complete, the entire mass coagulating to a jelly-like consistency without precipitation or separation of the serum or hemoglobin iron. After coagulation the mass is removed and washed with water, then dried, and then ground, or it may be first dried, then ground, then washed, and then finally dried. The washing is for the purpose of removing from the crude coagulate those calcium albuminates which are soluble in water. The water-insoluble calcium albuminates remain and form the product of the new process.

The product is a deep-black powder of fine grain, having neither smell nor diagreeable taste. When very finely pulverized, it has a greenish-brown appearance. It is easily pulverized. It is insoluble in water, but is easily soluble up to about 98.3 per cent. in the pepsin-containing digestive fluids.

In place of the calcium hydroxid, calcium oxid and other basic calcium salts, such as calcium carbonate or calcium diphosphate in equivalent quantities, can be used.

Analysis of the compound shows that the iron is contained in a permanent and unchangeable form, although masked.

Having thus described our invention, we claim as new and desire to secure by Letters Patent—

1. The process herein described of producing a blood-albumen insoluble in water, which consists in mixing with defibrinated blood a quantity of calcium hydroxid sufficient to coagulate the same into a jelly-like mass, without precipitation of the serum or hemoglobin iron, drying the coagulated mass thus obtained, grinding the same, washing the same with water, and finally drying the same, substantially as set forth.

2. The process herein described of producing a blood-albumen insoluble in water, which consists in defibrinating animal-blood, mixing with the same calcium hydroxid in the proportion of four to five kilograms of a forty to fifty per cent. aqueous paste of calcium hydroxid to one hundred kilograms of the defibrinated blood, drying the coagulated mass thus obtained, grinding the same, washing out the water-soluble substances contained therein, and finally drying the same, substantially as set forth.

MAX DIETRICH.
ALFONS LANGER.

Witnesses:
WOLDEMAR HAUPT,
HENRY HASPER.